(12) United States Patent
Zhao

(10) Patent No.: US 11,008,802 B2
(45) Date of Patent: *May 18, 2021

(54) METHODS FOR MANUFACTURING TEMPERED VACUUM GLASS AND PRODUCTION LINES THEREFOR

(71) Applicant: LUOYANG LANDGLASS TECHNOLOGY CO., LTD., Luoyang (CN)

(72) Inventor: Yan Zhao, Louyang (CN)

(73) Assignee: LUOYANG LANDGLASS TECHNOLOGY CO., LTD., Luoyang (CN)

( * ) Notice: Subject to any disclaimer, the term of this patent is extended or adjusted under 35 U.S.C. 154(b) by 211 days.

This patent is subject to a terminal disclaimer.

(21) Appl. No.: 16/061,741

(22) PCT Filed: Aug. 16, 2016

(86) PCT No.: PCT/CN2016/095466
§ 371 (c)(1),
(2) Date: Jun. 13, 2018

(87) PCT Pub. No.: WO2017/101479
PCT Pub. Date: Jun. 22, 2017

(65) Prior Publication Data
US 2018/0371827 A1 Dec. 27, 2018

(30) Foreign Application Priority Data
Dec. 15, 2015 (CN) .......................... 201510939968.5

(51) Int. Cl.
*E06B 3/677* (2006.01)
*C03B 23/24* (2006.01)
(Continued)

(52) U.S. Cl.
CPC ............ *E06B 3/6775* (2013.01); *B23K 1/002* (2013.01); *B23K 1/0008* (2013.01);
(Continued)

(58) Field of Classification Search
None
See application file for complete search history.

(56) References Cited

U.S. PATENT DOCUMENTS 4,204,721 A * 5/1980 Hubert ................... C03C 27/046
445/25
7,204,102 B1 * 4/2007 Eames .................... C03C 27/08
65/36

(Continued)

FOREIGN PATENT DOCUMENTS

WO WO-2016078593 A1 * 5/2016 ......... E06B 3/67334

*Primary Examiner* — Lisa L Herring
(74) *Attorney, Agent, or Firm* — Morgan, Lewis & Bockius LLP

(57) ABSTRACT

The disclosure discloses a manufacturing method of tempered vacuum glass. At least one glass substrate constituting the tempered vacuum glass is reserved with an extraction opening, and the manufacturing method comprises the following steps: (1) manufacturing metalized layers, and performing tempering or thermal enhancement on the glass substrates; (2) placing a metal solder on the metalized layers; (3) superposing the glass substrates; (4) heating the overall glass substrates to 60-150° C.; (5) hermetically sealing the glass substrates under the condition of ensuring the heating temperature; (6) heating; (7) vacuumizing; and (8) closing the extraction opening, thus accomplishing the manufacturing process. The manufacturing method in the present disclosure can greatly reduce the stress when the two glass substrates are sealed, improve the soldering strength and prolong the service life of the tempered vacuum glass.

(Continued)

The disclosure further discloses a tempered vacuum glass production line based on the above manufacturing method.

24 Claims, 4 Drawing Sheets

(51) Int. Cl.
  *C03C 27/08*   (2006.01)
  *B23K 1/00*   (2006.01)
  *B23K 1/002*   (2006.01)
  *B23K 1/005*   (2006.01)
  *B23K 1/20*   (2006.01)
  *B23K 37/04*   (2006.01)
  *E06B 3/673*   (2006.01)
  *B23K 103/00*   (2006.01)

(52) U.S. Cl.
  CPC .............. *B23K 1/0056* (2013.01); *B23K 1/20* (2013.01); *B23K 37/04* (2013.01); *C03B 23/24* (2013.01); *C03C 27/08* (2013.01); *E06B 3/6736* (2013.01); *E06B 3/67373* (2013.01); *B23K 2103/54* (2018.08); *Y02P 40/57* (2015.11)

(56) References Cited

U.S. PATENT DOCUMENTS

| | | | | |
|---|---|---|---|---|
| 2009/0151853 | A1* | 6/2009 | Cooper | E06B 3/6612 156/104 |
| 2013/0140347 | A1* | 6/2013 | Friedl | E06B 3/67334 228/111.5 |
| 2013/0273296 | A1* | 10/2013 | Jeon | E06B 3/66304 428/69 |
| 2013/0291599 | A1* | 11/2013 | Zhao | C03B 23/245 65/152 |
| 2014/0050867 | A1* | 2/2014 | Zhao | E06B 3/6612 428/34 |
| 2014/0109370 | A1* | 4/2014 | Pemberton | E06B 3/67304 29/33 P |
| 2017/0268285 | A1* | 9/2017 | Abe | E06B 3/67304 |
| 2018/0066470 | A1* | 3/2018 | Dai | E06B 3/67334 |

* cited by examiner

METHODS FOR MANUFACTURING TEMPERED VACUUM GLASS AND PRODUCTION LINES THEREFOR

CLAIM FOR PRIORITY

This application is a U.S. national phase entry under 35 U.S.C. § 371 from PCT International Application No. PCT/CN2016/095466 filed on Aug. 16, 2016, which is based upon and claims the benefit of priority from the prior Chinese Patent Application No. 201510939968.5, filed on Dec. 15, 2015. The entire contents of the above applications are incorporated herein by reference.

TECHNICAL FIELD

The present disclosure relates to the manufacturing field of vacuum glass, and particularly relates to a manufacturing method of one type of tempered vacuum glass and a tempered vacuum glass production line based on the manufacturing method.

BACKGROUND ART

Vacuum glass with excellent heat insulation, sound insulation and energy-saving effects represents the development direction of future new-generation energy-saving architectural glass, and is increasingly widely popularized and used. Vacuum glass was first researched in the 1990s, for example, Australian Patent No. AU94192667.2 disclosed a manufacturing method of vacuum glass, which opened the door to vacuum glass research. Soon afterwards, some research had been made around this technology at home and abroad, but due to the process reasons, the manufactured vacuum glass was non-tempered vacuum glass, which did not meet the standards of architectural safety glass and greatly obstructed the application of vacuum glass in high-rise buildings and some special occasions. How to manufacture tempered vacuum glass becomes the focus of research at home and abroad. Based on these, the applicant proposed a glass plate combination sealing method in Chinese invention patent No. 201010508421.7, wherein sealing the circumference of vacuum glass with low melting point metal successfully solves the worldwide problem that other sealing processes may easily cause back tempering of tempered glass substrates, realizes processing and manufacturing of tempered vacuum glass, and propels forward the development and wide application of vacuum glass.

When the tempered vacuum glass is manufactured, the basic sealing strength of two pieces of glass is an important performance parameter of the tempered vacuum glass. Continuously breaking through the existing technical barriers, providing better solutions and propelling the development of tempered vacuum glass industry are goals continuously pursued by those skilled in the art. Therefore, how to improve the sealing strength is a goal continuously explored by those skilled in the art.

DISCLOSURE CONTENTS

In practical application, the applicant discovers that stress is produced after cooling solidification due to different expansion coefficients of a solder and a metalized layer during sealing. Aiming at the problems of the prior art, one of the aims of the present disclosure is to provide a manufacturing method of tempered vacuum glass, which can greatly reduce the stress when two glass substrates are sealed, increase the connection strength, realize continuous efficient production of tempered vacuum glass and reduce the production cost; and the other aim of the present disclosure is to provide a continuous and automatic production line of tempered vacuum glass, which provides an equipment support for batch production.

In order to achieve the above goals, the present disclosure discloses a manufacturing method of tempered vacuum glass, an extraction opening is pre-configured on at least one glass substrate constituting the tempered vacuum glass, and the manufacturing method includes the following steps:

(1) manufacturing metalized layers on the to-be-sealed areas of the said glass substrates, and performing tempering or thermal enhancement on the glass substrates;

(2) placing a metal solder on the metalized layers;

(3) preheating and superposing the glass substrates by adopting one of the following methods:

a, heating the two glass substrates to 60-150° C. respectively, then setting the metalized layers of the to-be-sealed areas of the two glass substrates oppositely, and superposing the glass substrates, so that the metal solder is positioned between the metalized layers of the to-be-sealed areas; or b, setting the metalized layers of the to-be-sealed areas of the two glass substrates oppositely, superposing the glass substrates so that the metal solder is positioned between the metalized layers of the to-be-sealed areas, and then heating the two superposed glass substrates to 60-150° C.;

(4) hermetically sealing the to-be-sealed areas by adopting a metal brazing process to form a tempered glass assembly;

(5) heating the tempered glass assembly to 100-230° C.;

(6) vacuumizing the inner cavity of the tempered glass assembly to a preset vacuum degree; and (7) closing the extraction opening, thus accomplishing the manufacturing process of the vacuum glass.

Further, the temperature of the two superposed glass substrates is maintained at 60-150° C. before step (4).

Further, the heating temperature in step (3) is 80-120° C.

Further, when the glass substrates are coated glass substrates, the to-be-sealed areas of the coated glass substrates are decoated before the metalized layers are prefabricated.

Further, in step (1), it further includes a step of manufacturing a support for supporting the inner cavity, that is, firstly, printing on a preset position of one glass substrate with pasty glass glaze to form an array of raised dots; and then, sintering the glass glaze into the support solidified with the glass substrate together by a high-temperature sintering process.

Further, the method further includes a step of placing the support before the two glass substrates are superposed, namely, placing the solid support at the set position of one glass substrate.

Further, in step (4), the to-be-sealed areas are partially heated by adopting the metal brazing process in a laser heating, flame heating, electric current heating, induction heating, microwave heating, radiation heating or convection heating mode.

Further, in step (7), the tempered glass assembly is vacuumized in a vacuum chamber, and the tempered glass assembly is heated to 100-230° C. during vacuumizing.

Further, before the two glass substrates are superposed in step (3), a getter is placed on at least one of the glass substrates, and the getter is activated after step (6) is completed.

Further, a metalized layer is further premanufactured on the circumference of the extraction opening in step (1), the extraction opening is covered by a sealing plate preset with a metal solder before step (7), and the extraction opening is sealed by melting the metal solder preset on the sealing plate.

A production line of tempered vacuum glass based on the above manufacturing method includes a metalized layer manufacturing device, a solder placing device, a first preheating device, a superposing device, one or more soldering and edge-sealing devices, a second preheating device, a vacuumizing system and a sealing device which are connected in sequence by a first conveying device, wherein glass substrates are heated to 60-150° C. by the first preheating device and then subject to edge sealing treatment by one or more of the soldering and edge-sealing devices, and the vacuumizing system includes one or more vacuum chambers and an air extracting device connected with the vacuum chambers.

A production line of tempered vacuum glass based on the above manufacturing method includes a metalized layer manufacturing device, a solder placing device, a superposing device, a first preheating device, one or more soldering and edge-sealing devices, a second preheating device, a vacuumizing system and a sealing device which are connected in sequence by a first conveying device, wherein glass substrates are heated to 60-150° C. by the first preheating device and then subject to edge sealing treatment by one or more of the soldering and edge-sealing devices, and the vacuumizing system includes one or more vacuum chambers and an air extracting device connected with the vacuum chambers.

Further, the first preheating device and/or the second preheating device are radiation type glass plate heating furnaces or convection type glass plate heating furnaces.

Further, the superposing device includes a lifting mechanism arranged on one side of the first conveying device, the lifting mechanism is provided with a lifting arm, a turnover mechanism is arranged on the lifting arm, and the turnover mechanism is provided with a vacuum sucking disc or a clamping device; when the superposing device works, the vacuum sucking disc or the clamping device grabs the second glass substrate, the lifting mechanism lifts the second glass substrate to a preset height and then turns the second glass substrate over, and the turned second glass substrate is placed on top of the first glass substrate, thus accomplishing superposition.

Further, a second conveying device is arranged on the side of the first conveying device, the first conveying device is used for conveying the first glass substrate, and the second conveying device is used for conveying the second glass substrate.

Further, the superposing device includes a rotating shaft arranged between the first and second conveying devices, the rotating shaft is connected with a swing arm inserted into a position below the second glass substrate along the gap of the second conveying device, and a vacuum sucking disc or a clamping device is arranged on the swing arm; when the superposing device works, the vacuum sucking disc or the clamping device grabs the second glass substrate, the swing arm is turned over around the rotating shaft, and the second glass substrate is placed on top of the first glass substrate on the first conveying device, thus accomplishing superposition.

Further, the superposing device includes a hanging transmission device arranged above the first conveying device, the hanging transmission device is used for transferring the second glass substrate and includes a transmission mechanism, and the transmission mechanism is provided with a lifting device with a vacuum sucking disc or a clamping mechanism; when the superposing device works, the lifting device descends, the vacuum sucking disc or the clamping mechanism grabs and fixes the second glass substrate on the first conveying device, then the lifting device ascends, the second glass substrate is conveyed to a position above the first glass substrate to be superposed, and the second glass substrate is placed on top of the first glass substrate, thus accomplishing superposition.

Further, the superposing device includes a multi-degree-of-freedom manipulator arranged on one side of the first conveying device, and the manipulator is provided with a vacuum sucking disc or a clamping device; when the superposing device works, the vacuum sucking disc or the clamping device grabs the second glass substrate, and turns the second glass substrate over and then places it on the first glass substrate, thus accomplishing superposition.

Further, the production line is provided with a support placing device, which is arranged on a station between the metalized layer manufacturing device and the soldering and edge-sealing device.

Further, the production line is provided with a support placing device, which is arranged on a station between the solder placing device and the superposing device.

Further, the production line includes a support manufacturing device arranged between the metalized layer manufacturing device and the solder placing device, and the support manufacturing device includes a screen printing device, a drying device and a sintering device.

Further, the soldering and edge-sealing device is one of a laser heating device, a microwave heating device, a flame heating device, an induction heating device or a convection heating device.

Further, when there is one soldering and edge-sealing device, the soldering and edge-sealing device is arranged on one side of the first conveying device, and the conveying direction of the soldering and edge-sealing device is perpendicular to that of the first conveying device.

Further, when there is one soldering and edge-sealing device, the soldering and edge-sealing device is arranged on the first conveying device, and the conveying direction of the soldering and edge-sealing device is consistent with that of the first conveying device.

Further, when there are multiple soldering and edge-sealing devices, the soldering and edge-sealing devices are arranged on one side or two sides of the first conveying device, and the conveying directions of the soldering and edge-sealing devices are perpendicular to the conveying direction of the first conveying device.

Further, the production line includes a glass tempering device, which is arranged on a station between the metalized layer manufacturing device and the solder placing device.

Further, the metalized layer manufacturing device includes a screen printing device, a drying device and a sintering device.

Further, the production line includes a getter activating device arranged in the vacuum chamber.

Further, when a plurality of vacuum chambers are equipped, the vacuum chambers are connected in sequence in the glass conveying direction; and the sealing device is arranged inside the vacuum chamber.

According to the manufacturing method of tempered vacuum glass in the present disclosure, the glass substrates are heated to 60-150° C. before sealing and then subject to edge sealing through brazing, so that the stress when the two glass substrates are sealed is greatly reduced, the soldering strength is improved, and the service life of the tempered vacuum glass is prolonged. In addition, the present disclosure further discloses a tempered vacuum glass production line based on the manufacturing method.

DETAILED DESCRIPTION

The specific embodiments of the present disclosure will be described in detail below in combination with the accompanying drawings.

Embodiment 1

Figure 1:
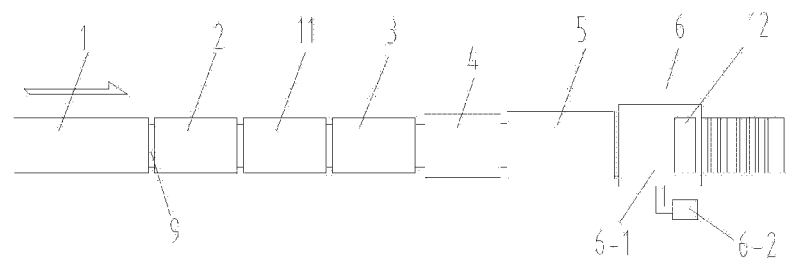
FIG. 1 is a schematic diagram of embodiment 1 of the present disclosure.
Figure 10:
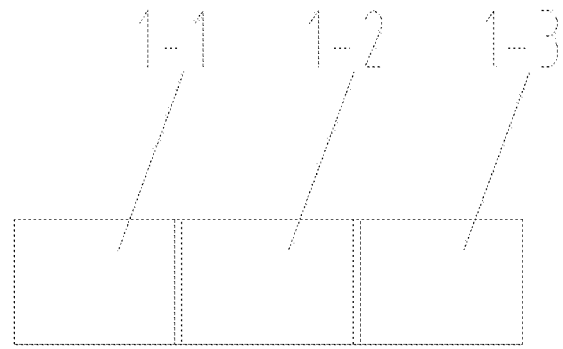
FIG. 10 is a schematic diagram of the metalized layer manufacturing device 1.

FIG. 1 and FIG. 10 show the first specific embodiment of a tempered vacuum glass production line in the present disclosure. In this embodiment, the production line specifically includes a first conveying device 9, e.g., a conveying roller bed, and a metalized layer manufacturing device 1, a solder placing device 2, a first preheating device 11, a superposing device 3, a soldering and edge-sealing device 4, a second preheating device 5, a vacuumizing system 6 and a sealing device 12 which are connected in sequence by a first conveying device 9, wherein the first preheating device 11 is used for heating glass substrates to 60-150° C. before the glass substrates are superposed, and then the soldering and edge-sealing device 4 performs edge sealing treatment; of course, the first preheating device 11 can also be arranged on the next station of the superposing device 3, to heat the overall superposed glass substrates to 60-150° C. The sealing device 12 is arranged in the vacuumizing system 6, the vacuumizing system 6 includes a vacuum chamber 6-1, a vacuum valve is arranged at each of the inlet end and the outlet end of the vacuum chamber 6-1, the vacuum chamber 6-1 is connected with an air extracting device 6-2, and a getter activating device is further arranged in the vacuum chamber 6-1.

The metalized layer manufacturing device 1 includes a screen printing device 1-1, a drying device 1-2 and a sintering device 1-3. The drying device 1-2 and the sintering device 1-3 form an integrated device. The sintering device 1-3 is a glass tempering device.

The first preheating device 11 and/or the second preheating device 5 are radiation type glass plate heating furnaces or convection type glass plate heating furnaces.

The tempered vacuum glass includes two glass substrates, one glass substrate is preset with an extraction opening, or two glass substrates are both preset with extraction openings, and a method for manufacturing the tempered vacuum glass on the production line of embodiment 1 includes the following steps.

Step (1): On four edges of the surface of the glass substrates are band-shaped to-be-sealed areas, metalized layers are manufactured on the to-be-sealed areas by the metalized layer manufacturing device 1, and the glass substrates are tempered or thermally enhanced; and the detailed step of manufacturing the metalized layers has been disclosed in previous patent application of the applicant, and will not be redundantly described herein.

Step (2): metal solder is placed on the metalized layers by the solder placing device 2.

Step (3): the glass substrates are preheated and superposed by adopting one of the following methods:

a, firstly, the two glass substrates are heated to 60-150° C. respectively by the first preheating device 11, then the metalized layers of the two glass substrates are set oppositely by the superposing device 3, and the glass substrates are superposed, so that the metal solder is positioned between the metalized layers; for the superposing device 3, reference may be made to Chinese invention patent No. 201420110435.7; the superposing device 3 mainly includes a lifting mechanism arranged on one side of the conveying device, e.g., a chain wheel lifting mechanism, a servo piston cylinder lifting mechanism or the like, the lifting mechanism is provided with a lifting arm inserted into a roller gap to reach a position below the upper glass substrate, a turnover mechanism is arranged on the lifting arm, and the turnover mechanism is provided with a vacuum sucking disc; during working, the vacuum sucking disc grabs a passing-by upper glass substrate, the lifting mechanism lifts the upper glass substrate to a preset height and then turns the upper glass substrate over, and the turned glass substrate is placed on top of the passing-by lower glass substrate, thus accomplishing superposition;

b, firstly, the metalized layers of the two glass substrates are set oppositely by the superposing device 3, and the glass substrates are superposed, so that the metal solder is positioned between the metalized layers; and then the two superposed glass substrates are overall heated to 60-150° C. by the first preheating device 11.

Preferably, the above heating temperature is 80-120° C.

Step (5): within the heating temperature range of step $(4)_{[1]}$, the metal solder is heated by using the soldering and edge-sealing device 4 and a metal brazing process, so that the metal solder is melted and solidified to hermetically seal the metalized layers of the two glass substrates to form a tempered glass assembly, in this way, the stress when the two glass substrates are sealed can be greatly reduced. The to-be-sealed areas are partially heated by adopting the metal brazing process in a laser heating, flame heating, electric current heating, induction heating, microwave heating, radiation heating or convection heating mode. The soldering and edge-sealing device 4 is one of a laser heating device, a microwave heating device, a flame heating device, an induction heating device or a convection heating device. In this embodiment, the number of the soldering and edge-sealing device 4 is one, the soldering and edge-sealing device 4 is arranged on the first conveying device 9, and the conveying direction of the soldering and edge-sealing device 4 is consistent with that of the first conveying device 9.

Step (6): the tempered glass assembly is heated to 100-230° C. by the second preheating device 5 before vacuumizing, to improve the exhaust efficiency and the exhaust effect.

Step (7): the inner cavity of the tempered glass assembly is vacuumized to a preset vacuum degree by the vacuumizing system 6, e.g., $10^{-2}$-$10^{-4}$ Pa, wherein an ultraviolet cleaning device or a plasma bombardment device acts on the tempered glass assembly during vacuumizing to decompose residual impurities in the inner cavity, and the volatile gas generated by decomposing is extracted from the inner cavity.

Step (8): the extraction opening is sealed by the sealing device 12, and the manufacturing of the tempered vacuum glass is accomplished.

According to the manufacturing method of the present disclosure, heating the glass substrates to 60-150° C. before the to-be-sealed areas are hermetically sealed is an important process parameter obtained by continuously improving the manufacturing process of tempered vacuum glass by the inventor in combination with a large volume of experimental data. If the glass substrates are directly soldered without preheating or at a low heating temperature, because the duration of the metal solder being melted at the peak temperature is short, hence the solder does not infiltrate the metalized layer thoroughly, and the soldering strength is insufficient; and during cooling after heating stops, because the glass substrates at a low temperature absorb heat quickly, the cold contraction stress generated by quick cooling of the solder is large, and then quite a large soldering stress is generated. However, if the heating temperature of the glass substrates is too high, e.g., more than 150° C., the high temperature is unbeneficial to improving the soldering strength and makes an extremely adverse effect on the metalized layers. The soldering strength of the tempered vacuum glass manufactured at different heating temperatures as stated above will be evaluated and compared by "frequencies against 100° C. temperature difference impact" in the following table. (Note: three glass samples are all vacuum glass composing of 5 mm tempered vacuum glass, having the size of 300 mm*300 mm)

ing strength can be obtained after soldering and edge-sealing, and the service life of the tempered vacuum glass can be prolonged.

Preferably, a metalized layer is further pre-manufactured on the circumference of the extraction opening in step (1), the extraction opening is covered by a sealing plate preset with a metal solder before step (7), and the extraction opening is sealed by melting the metal solder preset on the sealing plate.

When the glass substrates are coated glass substrates, the to-be-sealed areas of the coated glass substrates are decoated before the metalized layers are prefabricated. During decoating, the production line further includes a decoating device, the decoating device may also be separated from the production line, and decoating acts as a pretreatment process before the production line.

A getter is placed on at least one of the glass substrates before step (3), and the getter is activated after step (7) is completed.

Embodiment 2

Figure 2:
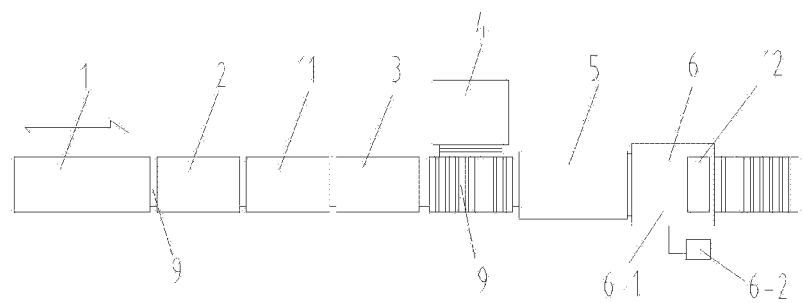
FIG. 2 is a schematic diagram of embodiment 2 of the present disclosure.

FIG. 2 shows a second specific embodiment of a tempered glass production line. This embodiment is substantially the same as embodiment 1 in structure, and the difference lies in that the soldering and edge-sealing device 4 is arranged on one side of the first conveying device 9, a push mechanism arranged on the first conveying device 9 pushes the glass substrate into the soldering and edge-sealing device 4, at the moment, the conveying direction of the soldering and edge-sealing device 4 is perpendicular to that of the first conveying device 9.

Embodiment 3

Figure 3:
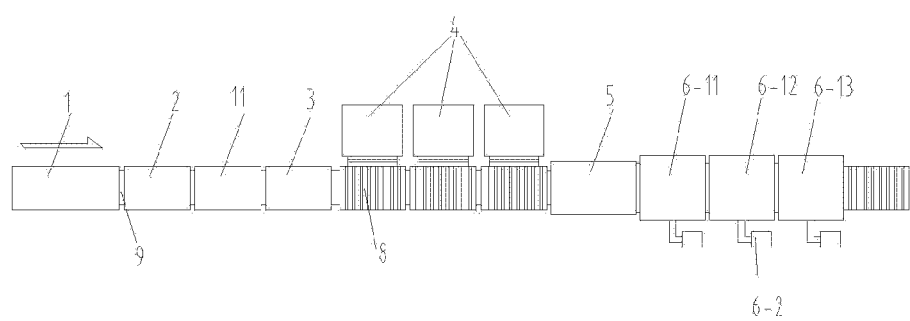
FIG. 3 is a schematic diagram of embodiment 3 of the present disclosure.

FIG. 3 shows a third specific embodiment of a tempered glass production line. This embodiment is substantially the same as embodiment 2 in structure, and the difference lies in that the number of the soldering and edge-sealing device 4

|  |  | heating temperature (° C.) | | | | | | | | | |
| --- | --- | --- | --- | --- | --- | --- | --- | --- | --- | --- | --- |
|  |  | 15 | 25 | 40 | 60 | 80 | 100 | 120 | 150 | 180 | 200 |
| glass sample 1 | sealing qualification rate (%) | 18 | 28 | 41 | 67 | 81 | 89 | 93 | 96 | 96 | 95 |
|  | frequencies (times) against 100° C. temperature difference impact | 45 | 85 | 100 | 260 | 300 | 500 | 700 | 820 | 820 | 800 |
| glass sample 2 | sealing qualification rate (%) | 17 | 27 | 40 | 68 | 83 | 90 | 92 | 95 | 94 | 92 |
|  | frequencies (times) against 100° C. temperature difference impact | 40 | 95 | 95 | 270 | 310 | 480 | 700 | 800 | 830 | 790 |
| glass sample 3 | sealing qualification rate (%) | 19 | 28 | 41 | 69 | 82 | 88 | 92 | 93 | 92 | 91 |
|  | frequencies (times) against 100° C. temperature difference impact | 40 | 80 | 100 | 280 | 315 | 490 | 700 | 800 | 820 | 780 |

It can be seen from the above experimental data that when the glass substrates are heated to 60-150° C., the frequency against 100° C. temperature difference impact of the sealed tempered vacuum glass is significantly improved, preferably, when the glass substrates are heated to 80-120° C. before soldering and edge-sealing, firm and reliable solderis three, and of course, the number of the soldering and edge-sealing device 4 can be increased or reduced according to the working efficiency of each station on the production line; in this way, a plurality of soldering and edge-sealing devices 4 can be arranged on the most time-consuming soldering and edge-sealing process of the whole production line, so that the production efficiency is improved; moreover, the conveying direction of the soldering and edge-sealing devices 4 is perpendicular to that of the first conveying device 9, so that the glass substrate can selectively enter any vacant soldering and edge-sealing device 4. The vacuum chambers 6-1 (see FIG. 2 or FIG. 1) include a front auxiliary vacuum chamber 6-11, a main vacuum chamber 6-12 and a rear auxiliary vacuum chamber 6-13 connected in sequence in the glass conveying direction. The vacuum degrees of the front auxiliary vacuum chamber 6-11 and the rear auxiliary vacuum chamber 6-13 are lower than the vacuum degree of the main vacuum chamber 6-12, and the vacuumizing efficiency can be improved in such a step vacuumizing mode. A vacuum valve is respectively arranged between every two of the front auxiliary vacuum chamber 6-11, the main vacuum chamber 6-12 and the rear auxiliary vacuum chamber 6-13, at the input end of the front auxiliary vacuum chamber 6-11 and at the output end of the rear auxiliary vacuum chamber 6-13.

Embodiment 4

Figure 4:
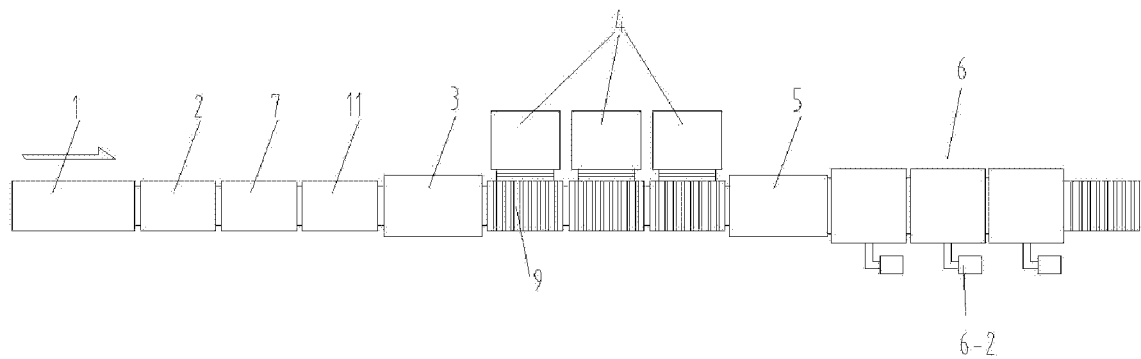
FIG. 4 is a schematic diagram of embodiment 4 of the present disclosure.

FIG. 4 shows a fourth specific embodiment of a tempered glass production line. This embodiment is substantially the same as embodiment 3 in structure, and the difference lies in that a support placing device 7 is arranged on a station between the solder placing device 2 and the first preheating device 11, and is used for placing the prefabricated solid middle support on the glass substrate. Of course, the support placing device 7 may also be arranged on a station between the metalized layer manufacturing device 1 and the solder placing device 2 or between the first preheating device 11 and the superposing device 3.

Embodiment 5

Figure 5:
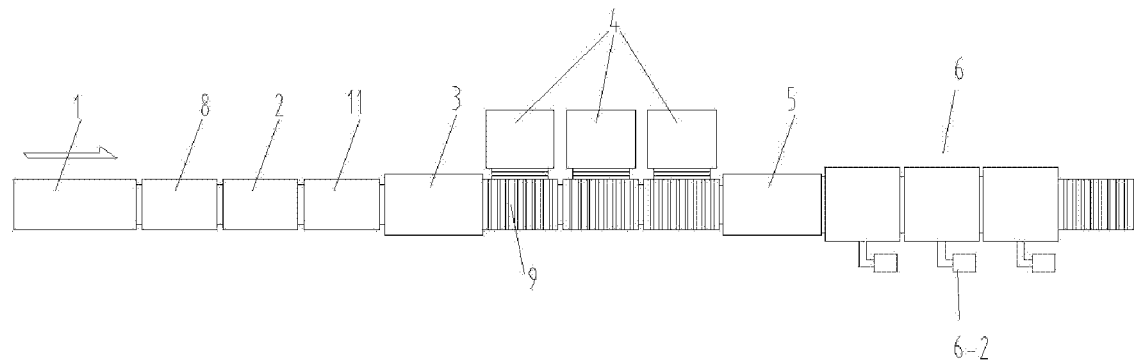
FIG. 5 is a schematic diagram of embodiment 5 of the present disclosure.
Figure 11:
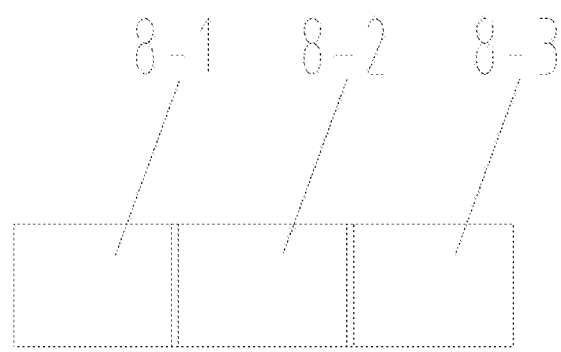
FIG. 11 is a schematic diagram of the support manufacturing device 8.

FIG. 5 and FIG. 11 show a fifth specific embodiment of a tempered glass production line. This embodiment is substantially the same as embodiment 3 in structure, and the difference lies in that a support manufacturing device 8 is arranged between the metalized layer manufacturing device 1 and the solder placing device 2; the support manufacturing device 8 includes a screen printing device 8-1, a drying device 8-2 and a sintering device 8-3; the drying device 8-2 and the sintering device 8-3 form an integrated device; and the sintering device 8-3 is a glass tempering device. The support manufacturing device 8 manufactures a middle support in the following steps: firstly, printing on a preset position of one glass substrate with pasty glass glaze to form an array of raised dots by using the screen printing device 8-1; and then, sintering the glass glaze into the support solidified with the glass substrate together through a high-temperature sintering process by using the drying device 8-2 and the sintering device 8-3.

Embodiment 6

Figure 6:
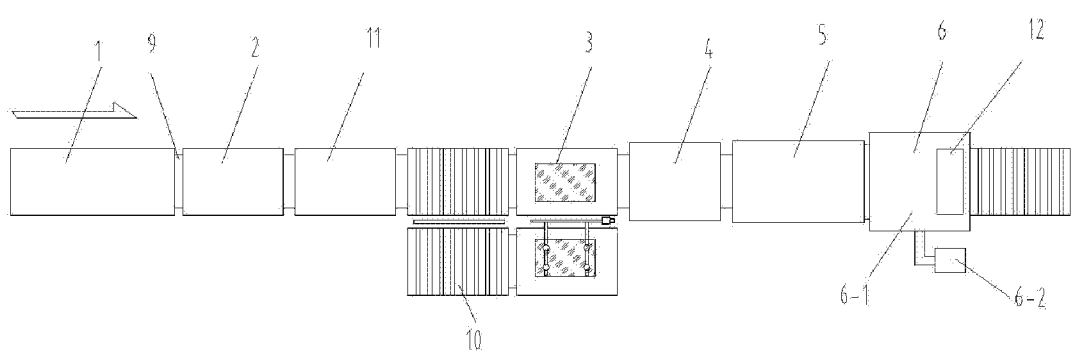
FIG. 6 is a schematic diagram of embodiment 6 of the present disclosure.
Figure 7:
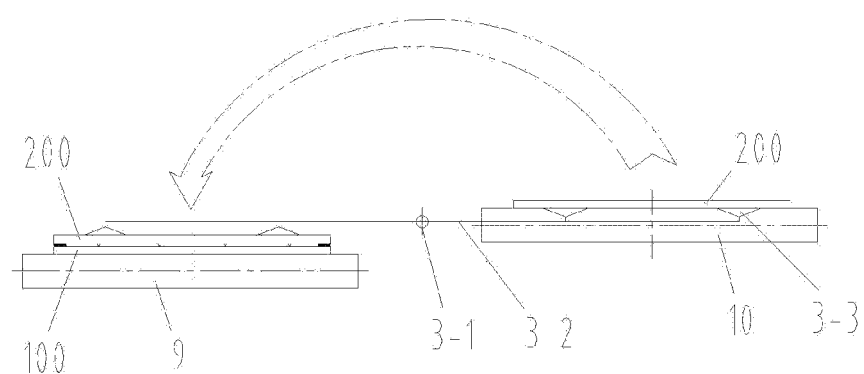
FIG. 7 is a superposing schematic diagram of the superposing device 3 in FIG. 6.

FIG. 6 and FIG. 7 show a sixth specific embodiment of a tempered glass production line. This embodiment is substantially the same as embodiment 1 in structure, and the difference lies in that a second conveying device 10, e.g., a conveying roller bed, is arranged on the side of the first conveying device 9, the first conveying device 9 is used for conveying the first glass substrate 100, and the second conveying device 10 is used for conveying the second glass substrate 200. The superposing device 3 includes a rotating shaft 3-1 arranged between the first and the second conveying devices 9 and 10, the rotating shaft 3-1 is connected with a swing arm 3-2 inserted to a position below the second glass substrate 200 along the gap of the second conveying device 10 and a vacuum sucking disc 3-3 or a clamping device is arranged on the swing arm 3-2; when the superposing device 3 works, the vacuum sucking disc 3-3 or the clamping device grabs the second glass substrate 200, the swing arm 3-2 is turned over around the rotating shaft 3-1, and the second glass substrate 200 is placed on the first glass substrate 100 on the first conveying device 9, thus accomplishing superposition.

Embodiment 7

Figure 8:
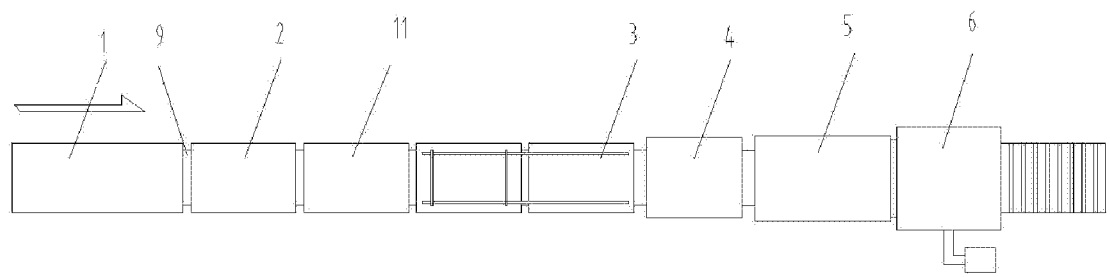
FIG. 8 is a schematic diagram of embodiment 7 of the present disclosure.
Figure 9:
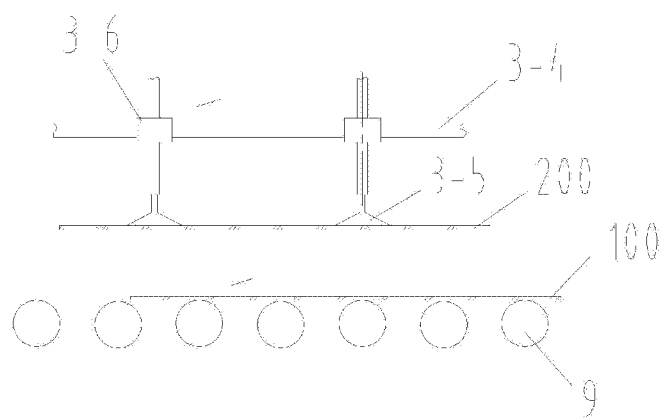
FIG. 9 is a superposing schematic diagram of the superposing device 3 in FIG. 8.

FIG. 8 and FIG. 9 show a seventh specific embodiment of a tempered glass production line. This embodiment is substantially the same as embodiment 1 in structure, and the difference lies in that the superposing device 3 includes a hanging transmission device arranged above the first conveying device 9, the hanging transmission device extends upstream and is connected with the station where the first preheating device 11 is located, the first conveying device 9 is used for conveying the first glass substrate 100, the hanging transmission device is used for transferring the second glass substrate 200 and includes a transmission mechanism 3-4, and the transmission mechanism 3-4 is provided with a lifting device 3-6 with a vacuum sucking disc 3-5 or a clamping mechanism, and the lifting device 3-6 is a screw lifting mechanism or a cylinder or the like; when the superposing device 3 works, the lifting device 3-6 descends, the vacuum sucking disc 3-5 or the clamping mechanism grabs and fixes the second glass substrate 200 on the first conveying device 9 and in the station where the solder placing device 2 is located, then the lifting device 3-6 ascends, the second glass substrate 200 is conveyed to a position above the first glass substrate 100 to be superposed, and the second glass substrate 200 is placed on the first glass substrate 100, thus accomplishing superposition.

Of course, the superposing device 3 may also be a multi-degree-of-freedom manipulator arranged on one side of the first conveying device 9, and the manipulator accomplishes superposition.

With regard to the above-mentioned seven embodiments, the first preheating device 11 may also be arranged on a station between the superposing device 3 and the soldering and edge-sealing device 4, so that the processing sequence on the production line is changed, and the two superposed glass substrates are heated as a whole.

The above examples are merely used for describing the present disclosure, but the embodiments of the present disclosure are not limited to these examples. Various specific embodiments made in accordance with the thought of the present disclosure by those skilled in the art shall fall into the protection scope of the present disclosure.

What is claimed is:
1. A production line for manufacturing tempered vacuum glass, comprising:
   a first conveying device conveying glass substrates in the production line;
   a metalized layer manufacturing device manufacturing metalized layers on to-be-sealed areas of the glass substrates, and perform tempering or thermal enhancement on the glass substrates;
   a solder placing device placing a metal solder on the metalized layers;

a first preheating device and a superposing device preheating and superposing the glass substrates, through one of:
  (a) heating by the first preheating device the glass substrates to 60-150° C. respectively, then setting the metalized layers of the to-be-sealed areas of the glass substrates oppositely, and superposing by the superposing device the glass substrates, so that the metal solder is positioned between the metalized layers of the to-be-sealed areas, or
  (b) setting by the superposing device the metalized layers of the to-be-sealed areas of the glass substrates oppositely, superposing by the superposing device the glass substrates so that the metal solder is positioned between the metalized layers of the to-be-sealed areas, and then heating by the first preheating device the glass substrates to 60-150° C.;
wherein the superposing device comprises:
  a multi-degree-of-freedom manipulator arranged on a side of the first conveying device; and
  a vacuum sucking disc or a clamping device coupled to the multi-degree-of-freedom manipulator;
  wherein the superposing device superposing the glass substrates comprises: the vacuum sucking disc or the clamping device grabbing a second glass substrate of the glass substrates, and the second glass substrate being turned over and then placed on a first glass substrate of the glass substrates;
one or more soldering and edge-sealing devices performing hermetic sealing on the to-be-sealed areas by adopting a metal brazing process to form a tempered glass assembly;
a second preheating device heating the tempered glass assembly to 100-230° C.;
a vacuumizing system, comprising one or more vacuum chambers and an air extracting device connected with the one or more vacuum chambers vacuuming an inner cavity of the tempered glass assembly to a preset vacuum degree; and
a sealing device sealing up an extraction opening of the glass substrates.

2. The tempered vacuum glass production line of claim 1, wherein the first preheating device and/or the second preheating device are a radiation type of glass plate heating furnaces or a convection type of glass plate heating furnaces.

3. The tempered vacuum glass production line of claim 1, further comprising:
a second conveying device is arranged on the side of the first conveying device,
wherein the first conveying device conveys the first glass substrate of the glass substrates, and the second conveying device conveys the second glass substrate of the glass substrates.

4. The tempered vacuum glass production line of claim 1, further comprising a support placing device, which is arranged on a station between the metalized layer manufacturing device and the one or more soldering and edge-sealing devices.

5. The tempered vacuum glass production line of claim 1, further comprising a support placing device, which is arranged on a station between the solder placing device and the superposing device.

6. The tempered vacuum glass production line of claim 1, further comprising:
a support manufacturing device arranged between the metalized layer manufacturing device and the solder placing device,
wherein the support manufacturing device comprises a screen printing device, a drying device, and a sintering device.

7. The tempered vacuum glass production line of claim 1, further comprising a decoating device decoating the to-be-sealed areas when the glass substrates are coated glass substrates.

8. The tempered vacuum glass production line of claim 1, wherein:
the one or more soldering and edge-sealing devices include one soldering and edge-sealing device, the soldering and edge-sealing device is arranged on the side of the first conveying device, and
a conveying direction of the soldering and edge-sealing device is perpendicular to or consistent with a conveying direction of the first conveying device.

9. The tempered vacuum glass production line of claim 1, wherein
the one or more soldering and edge-sealing devices include multiple soldering and edge-sealing devices, the multiple soldering and edge-sealing devices are arranged on the side or two sides of the first conveying device, and
conveying directions of the multiple soldering and edge-sealing devices are perpendicular to a conveying direction of the first conveying device.

10. The tempered vacuum glass production line of claim 1, further comprising: a glass tempering device, which is arranged on a station between the metalized layer manufacturing device and the solder placing device.

11. The tempered vacuum glass production line of claim 1, wherein the metalized layer manufacturing device comprises a screen printing device, a drying device, and a sintering device.

12. The tempered vacuum glass production line of claim 1, further comprising a getter activating device arranged in the one or more vacuum chambers.

13. The tempered vacuum glass production line of claim 1, wherein
the one or more vacuum chambers are connected in sequence along a glass conveying direction; and
the sealing device is arranged inside a last vacuum chamber in the sequence.

14. A production line for manufacturing tempered vacuum glass, comprising:
a first conveying device conveying glass substrates in the production line;
a metalized layer manufacturing device manufacturing metalized layers on to-be-sealed areas of the glass substrates, and perform tempering or thermal enhancement on the glass substrates;
a solder placing device placing a metal solder on the metalized layers;
a first preheating device and a superposing device preheating and superposing the glass substrates, through one of:
  (a) heating by the first preheating device the glass substrates to 60-150° C. respectively, then setting the metalized layers of the to-be-sealed areas of the glass substrates oppositely, and superposing by the superposing device the glass substrates, so that the metal solder is positioned between the metalized layers of the to-be-sealed areas, or
  (b) setting by the superposing device the metalized layers of the to-be-sealed areas of the glass substrates oppositely, superposing by the superposing device the glass substrates so that the metal solder is positioned between the metalized layers of the to-be-sealed areas, and then heating by the first preheating device the glass substrates to 60-150° C.;
wherein the superposing device comprises:
a lifting mechanism arranged on one side of the first conveying device;
a lifting arm provided with the lifting mechanism; and
a turnover mechanism is arranged on the lifting arm;
wherein:
the turnover mechanism is provided with a vacuum sucking disc or a clamping device; and
the superposing device superposing the glass substrates comprises: the vacuum sucking disc or the clamping device grabbing a second glass substrate of the glass substrates,
the lifting mechanism lifting the second glass substrate to a preset height and then turning the second glass substrate over, and
the turned second glass substrate being placed on a first glass substrate of the glass substrates;
one or more soldering and edge-sealing devices performing hermetic sealing on the to-be-sealed areas by adopting a metal brazing process to form a tempered glass assembly;
a second preheating device heating the tempered glass assembly to 100-230° C.;
a vacuumizing system, comprising one or more vacuum chambers and an air extracting device connected with the one or more vacuum chambers vacuuming an inner cavity of the tempered glass assembly to a preset vacuum degree; and
a sealing device sealing up an extraction opening of the glass substrates.

15. The tempered vacuum glass production line of claim 14, wherein the first preheating device and/or the second preheating device are a radiation type of glass plate heating furnaces or a convection type of glass plate heating furnaces.

16. The tempered vacuum glass production line of claim 14, further comprising a getter activating device arranged in the one or more vacuum chambers.

17. The tempered vacuum glass production line of claim 14, wherein
the one or more vacuum chambers are connected in sequence along a glass conveying direction; and
the sealing device is arranged inside a last vacuum chamber in the sequence.

18. A production line for manufacturing tempered vacuum glass, comprising:
a first conveying device conveying glass substrates in the production line;
a metalized layer manufacturing device manufacturing metalized layers on to-be-sealed areas of the glass substrates, and perform tempering or thermal enhancement on the glass substrates;
a solder placing device placing a metal solder on the metalized layers;
a first preheating device and a superposing device preheating and superposing the glass substrates, through one of:
(a) heating by the first preheating device the glass substrates to 60-150° C. respectively, then setting the metalized layers of the to-be-sealed areas of the glass substrates oppositely, and superposing by the superposing device the glass substrates, so that the metal solder is positioned between the metalized layers of the to-be-sealed areas, or
(b) setting by the superposing device the metalized layers of the to-be-sealed areas of the glass substrates oppositely, superposing by the superposing device the glass substrates so that the metal solder is positioned between the metalized layers of the to-be-sealed areas, and then heating by the first preheating device the glass substrates to 60-150° C.;
wherein the superposing device comprises:
a rotating shaft arranged between the first and second conveying devices;
a swing arm connected to the rotating shaft and inserted into a gap between a second glass substrate of the glass substrates and the second conveying device; and
a vacuum sucking disc or a clamping device arranged on the swing arm;
wherein the superposing device superposing the glass substrates comprises:
the vacuum sucking disc or the clamping device grabbing the second glass substrate,
the swing arm being turned over around the rotating shaft, and
the second glass substrate being placed on a first glass substrate of the glass substrates on the first conveying device;
one or more soldering and edge-sealing devices performing hermetic sealing on the to-be-sealed areas by adopting a metal brazing process to form a tempered glass assembly;
a second preheating device heating the tempered glass assembly to 100-230° C.;
a vacuumizing system, comprising one or more vacuum chambers and an air extracting device connected with the one or more vacuum chambers vacuuming an inner cavity of the tempered glass assembly to a preset vacuum degree; and
a sealing device sealing up an extraction opening of the glass substrates.

19. The tempered vacuum glass production line of claim 18, wherein the first preheating device and/or the second preheating device are a radiation type of glass plate heating furnaces or a convection type of glass plate heating furnaces.

20. The tempered vacuum glass production line of claim 18, further comprising a getter activating device arranged in the one or more vacuum chambers.

21. The tempered vacuum glass production line of claim 18, wherein
the one or more vacuum chambers are connected in sequence along a glass conveying direction; and
the sealing device is arranged inside a last vacuum chamber in the sequence.

22. A production line for manufacturing tempered vacuum glass, comprising:
a first conveying device conveying glass substrates in the production line;
a metalized layer manufacturing device manufacturing metalized layers on to-be-sealed areas of the glass substrates, and perform tempering or thermal enhancement on the glass substrates;
a solder placing device placing a metal solder on the metalized layers;
a first preheating device and a superposing device preheating and superposing the glass substrates, through one of:
(a) heating by the first preheating device the glass substrates to 60-150° C. respectively, then setting the metalized layers of the to-be-sealed areas of the glass substrates oppositely, and superposing by the superposing device the glass substrates, so that the metal solder is positioned between the metalized layers of the to-be-sealed areas, or (b) setting by the superposing device the metalized layers of the to-be-sealed areas of the glass substrates oppositely, superposing by the superposing device the glass substrates so that the metal solder is positioned between the metalized layers of the to-be-sealed areas, and then heating by the first preheating device the glass substrates to 60-150° C.;

wherein the superposing device comprises:
a hanging transmission device arranged above the first conveying device,
wherein:
the hanging transmission device transfers a second glass substrate of the glass substrates and comprises a transmission mechanism; and
the transmission mechanism is provided with a lifting device including a vacuum sucking disc or a clamping mechanism;
the superposing device superposing the glass substrates comprises: the lifting device descending, the vacuum sucking disc or the clamping mechanism grabbing the second glass substrate from the first conveying device, the lifting device then ascending and transferring the second glass substrate to a position above a first glass substrate of the glass substrates to be superposed, and placing the second glass substrate on the first glass substrate;

one or more soldering and edge-sealing devices performing hermetic sealing on the to-be-sealed areas by adopting a metal brazing process to form a tempered glass assembly;

a second preheating device heating the tempered glass assembly to 100-230° C.;

a vacuumizing system, comprising one or more vacuum chambers and an air extracting device connected with the one or more vacuum chambers vacuuming an inner cavity of the tempered glass assembly to a preset vacuum degree; and a sealing device sealing up an extraction opening of the glass substrates.

23. The tempered vacuum glass production line of claim 22, wherein the first preheating device and/or the second preheating device are a radiation type of glass plate heating furnaces or a convection type of glass plate heating furnaces.

24. The tempered vacuum glass production line of claim 22, further comprising a getter activating device arranged in the one or more vacuum chambers.

* * * * *